United States Patent Office 2,761,889
Patented Sept. 4, 1956

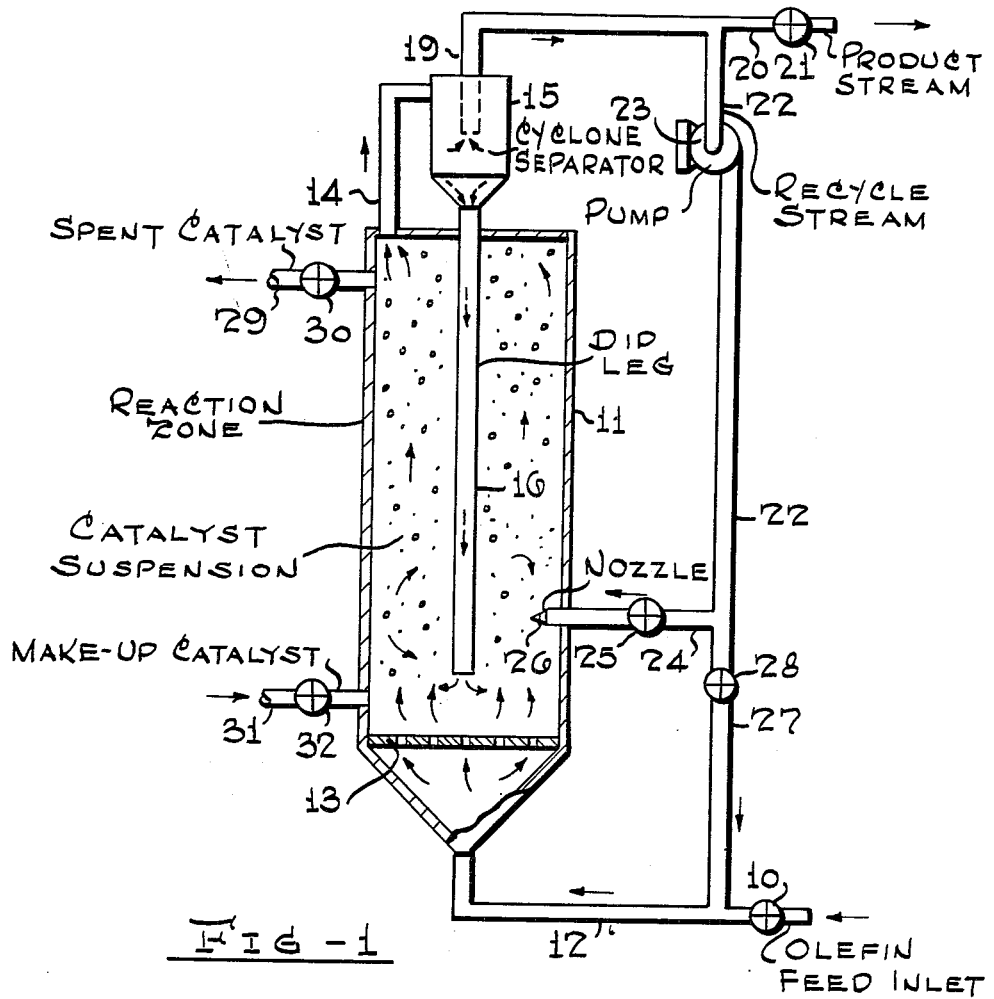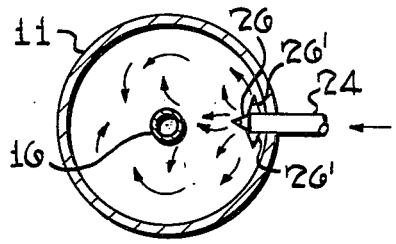

2,761,889

SUSPENSION-TYPE POLYMERIZATION PROCESS

Walter G. May, Union, N. J., and George L. Matheson, deceased, late of Summit, N. J., by The Summit Trust Co., executor, Summit, N. J., assignors to Esso Research and Engineering Company, a corporation of Delaware Application September 17, 1952, Serial No. 310,048

6 Claims. (Cl. 260—683.15)

This invention relates to an improved non-regenerative catalytic polymerization process in which olefin hydrocarbons are continuously polymerized by means of a solid polymerization catalyst suspended in fluid hydrocarbon. More particularly, it relates to a process in which olefins are polymerized to form high octane polymers boiling in the gasoline boiling range which are suitable as motor fuel blending agents and the like.

It is known in the art to suspend finely divided solid polymerization catalyst in dense fluid hydrocarbon and to contact an olefin to be polymerized with the agitated suspension under polymerization conditions. A particularly suitable method has been to maintain the catalyst in suspension by means of mechanical stirrers. This procedure also helps to maintain uniform reaction conditions throughout the zone and gives good top to bottom mixing of catalyst in the zone. This type of operation, however, presents mechanical difficulties at high reaction pressures due to leakage of hydrocarbons through packing glands needed for the mechanical stirrers. Furthermore, severe mechanical agitation of the catalyst causes attrition thereof at a rapid rate resulting in high loss of catalyst due to entrainment with the product.

It has also been proposed to carry out a suspension-type process of the above character by using a hindered settler reaction zone in which catalyst is maintained in suspension by upflow of the hydrocarbon feed. This type of operation presents difficulties in maintaining uniform mixing of the suspension and in preventing stratification of the catalyst. Indeed, such systems are operated such that stratification does occur, the coarser sizes of the catalyst settling to the bottom, the smaller sizes at the top, and here may be an interface existing between a lower dense catalyst phase and an upper solid free phase. It is a primary purpose of the present invention to provide a suspension-type polymerization process that overcomes some of these difficulties without the necessity of using mechanical stirrers or other similar agitating devices.

In accordance with the present invention, a substantially uniform suspension of finely divided solid polymerization catalyst in fluid hydrocarbon is maintained throughout the reaction zone. Olefin feed is continuously passed upwardly through the suspension under polymerization conditions of pressure, temperature, contact time and the like. Effluent containing polymerized olefins and suspended catalyst is continuously withdrawn from the top of the reaction zone, and solid catalyst is separated from the hydrocarbon in the effluent by means of settling devices, cyclone separators or the like. The resulting substantially solid-free effluent is divided into a product stream and a recycle stream.

At least a major portion of the recycle effluent stream is introduced as at least one high velocity jetted stream at a lower intermediate point in the reaction zone, the direction of the flow of the jetted stream being substantially traverse to the flow of the olefin feed. The jetted stream causes turbulence and substantial mixing of the suspension throughout the zone. The solid catalyst separated from the effluent stream is continuously introduced into the lower portion of the suspension within the reaction zone at a point above the olefin feed inlet whereby it is recirculated through the zone. The introduction of jetted recycle effluent and separated catalyst at these points in the system provides an effective means for obtaining thorough top to bottom mixing of the catalyst, minimizes stratification of the catalyst within any specific portion of the reaction zone, and minimizes mechanical and attrition difficulties of the type encountered with mechanical stirrers.

In a further modification of the present invention, a minor portion of the recycled effluent stream is introduced into the bottom of the reaction zone, at a point below the introduction of the separated catalyst, and is passed upwardly through the suspension. Preferably, this stream is combined with the olefin feed and the mixture is introduced into the reaction zone. This modification is advantageous when the amount of olefin feed is insufficient to maintain the catalyst in suspension at the bottom portion of the reaction zone. Other advantages of the present process will become apparent from the following description taken in conjunction with Figures 1 and 2 which illustrate preferred embodiments of the invention.

Turning now to Figure 1, the numeral 11 designates a reaction zone containing a suspension of finely divided solid polymerization catalyst in fluid hydrocarbon. If desired, reaction zone 11 may be a jacketed reactor. Provision may be made for circulating a cooling medium through the jacket thereof for removing at least a portion of the exothermic heat of reaction formed during the polymerization process. This reaction zone is further provided with a bottom olefin feed inlet line 12 containing control valve 10 through which olefins are continuously introduced upwardly through the reaction zone. A distribution means 13, which may be a porous plate, a perforated plate, or the like, is provided in the bottom of reaction zone 11 above the olefin feed inlet. This distribution means permits a substantially uniform distribution of olefin feed throughout the cross sectional area of the reaction zone.

Zone 11 is also provided with a top effluent outlet line 14 which permits the withdrawal of effluent comprising suspended catalyst, polymerization products and unreacted olefins from the top portion of the suspension. Line 14 terminates in the upper portion of a separator 15, such as a conventional cyclone separator, wherein solids are removed from the hydrocarbon and settle by gravity downwardly through dip leg 16. Dip leg 16 fluidly connects the lower portion of separator 15 with the lower portion of the suspension reaction zone 11. Separator 15 may consist of a plurality of cyclone separators, filters, baffled settlers or the like, operating in series or parallel, if several are needed to effect substantially complete separation of solid and fluid.

Substantially solid-free effluent is withdrawn from separator 15 through pipe 19. This effluent is then divided into two streams, a portion of which is withdrawn through branch line 20 containing valve 21 and is sent to a product recovery system. The amount of the product stream withdrawn will substantially balance the amount of fresh feed introduced into the system to maintain the pressure constant. The remainder of the solid-free effluent stream is passed through line 22 containing pump 23 and is recycled to the suspension in the reaction zone. At least a major portion of the recycled effluent passes through branch line 24 containing control valve 25. Line 24 connects with nozzle 26 which is horizontally positioned in the suspension. This nozzle is of sufficiently small outlet diameter to form a high velocity jetted stream flowing traversely to the upward flow of the olefins. Obviously, line 24 may terminate in a plurality of nozzles extending into the suspension within the reaction zone. Nozzle 26 preferably points toward the cross sectional center of the reaction zone in order to obtain a high degree of mixing and turbulence within the reaction zone. The nozzle or nozzles should be positioned such that the jetted streams will not create a swirling or eddying action, characteristic of most mechanical stirrers, in the suspension. Such action subjects the catalyst particles to centrifugal force which results in non-uniform distribution of the particles.

A minor portion of the recycled effluent may, if desired, pass through branch line 27 containing control valve 28. Line 27 fluidly connects with olefin feed line 12. When the amount of olefin feed introduced through line 12 is insufficient to maintain catalyst in suspension in the bottom part of the reaction zone, this minor amount is introduced with the olefin feed to provide the additional upflowing hydrocarbons needed for fluidization purposes.

The separated catalyst flowing from the bottom of dip leg 16 is carried upwardly by the hydrocarbon flowing through distributor 13, distributed to the general area of the jetted recycle streams, and is then thoroughly dispersed and circulated through the upper portion of the reaction zone. This continued recycle of the catalyst insures good top to bottom mixing and uniform utilization of the catalyst.

Spent catalyst is continuously or intermittently withdrawn from the reaction zone by means of line 29 containing control valve 30. This spent catalyst is conveniently withdrawn as a suspension and may be disposed of. A constant catalyst inventory is maintained within the system by introducing make-up catalyst through line 31 containing valve 32, the make-up catalyst being substantially equivalent to the amount lost from the system by entrainment or by withdrawal through line 29. The make-up catalyst may conveniently be introduced as a suspension of finely divided catalyst in hydrocarbon, such as the polymer recovered from the product stream, or other suitable hydrocarbon material. Fresh catalyst is preferably introduced into the reaction zone below the point of the jetted recycle streams.

The positioning of the nozzle inlets is illustrated in Figure 2, which represents a cross section of the reaction zone. Nozzle 26 is directed toward the center of the reaction zone. A unidirectional flow of this type, providing the jetted stream is of extremely high velocity, will provide the desired circulation and mixing. The nozzles 26' point in a more or less opposed tangential direction toward the sides of the reaction zone to provide turbulence. The use of only one tangentially directed nozzle or any other such nozzle arrangement should be avoided if a swirling action on the suspension results. It will be obvious that a plurality of nozzles may be positioned at several vertical levels along the lower intermediate portion of the reaction zone. The term "lower intermediate portion" refers to positions above the olefin feed inlet and below the vertical center of the reaction zone. The nozzles should be positioned such that the jetted streams do not interfere with the free flow of catalyst from dip leg 16. Preferably the nozzles are positioned above the dip leg outlet. However, the dip leg may be positioned in the side of the reaction zone opposite the nozzle inlets, or the dip leg outlet may be baffled on the nozzle inlet side if the nozzles are below the dip leg outlet.

In order to create the desired degree of turbulence, the diameter of the jetted streams will usually be less than about 1/50 of the diameter of the reaction vessel 11; preferably the jetted stream diameters are at least 1/100 to 2/100 of the reaction vessel diameter. The relative sizes of the jetted streams will depend of course on the velocity that is required to cause them to penetrate a sufficient distance in the suspension to give the desired degree of agitation and turbulence.

The amount of hydrocarbon effluent recycle must be sufficient to maintain the catalyst in suspension and to furnish the desired degree of mixing. As a general rule, it will be necessary to maintain a ratio of recycle effluent to olefin feed above about 30:1, preferably in the range of about 100:1 to 400:1. As mentioned heretofore, at least a major portion of this recycle stream is introduced as the high velocity jets. Generally at least 10% of this recycle stream will be introduced into the reaction zone below the point of introduction of the recycled catalyst to prevent the catalyst from setting in the bottom portion of the zone.

It is important that solids be substantially completely removed from the hydrocarbon effluent before it is recycled to the suspension. If appreciable solids are present in this stream, they will interfere with pumping operations and furthermore will erode nozzles used for jetting the effluent. On the other hand, the separated and recycled solids may include admixed hydrocarbon. While it is most convenient to use separating devices positioned above the reaction zone in order to take advantage of gravity flow of solids back to the suspension, other arrangements may be used that will provide separate recycle of solids.

The finely divided catalysts useful in the practice of the present invention may be any of the conventional solid polymerization catalysts that are well known to the art. These include the so-called solid phosphoric acid catalysts which comprise an acid of phosphorus impregnated on a solid support such as kieselguhr, silica gel, various diatomaceous earths, alumina, activated carbon, and the like. Other catalysts include zirconia, thoria, dehydrated activated alumina, copper pyrophosphate and the like. While the size of the catalyst is not particularly critical, sizes in the range of about 20 to 200 mesh or even finer may be employed.

The fluid hydrocarbon phase in which the catalyst is suspended may be a liquid phase, a vapor phase or a critical phase at pressures above the critical for the hydrocarbons in the reaction zone. Although the process is operable at fairly low reaction pressure, it has particular application to operations with pressures above about 400 to 500 p. s. i. g., at which the hydrocarbons are fairly dense, since difficulties in keeping the catalyst uniformly suspended are more pronounced at the higher pressures. Pressures above about 900 p. s. i. g. are particularly desirable when polymerizing normally gaseous olefins in order to obtain a critical phase operation and to achieve high olefin conversions.

The temperature within the reaction zone is not particularly critical and will depend to a large extent on the type of catalyst being used and the particular olefin being polymerized. Temperatures within the range of about 250° to 600° F. are generally suitable for most conventional solid polymerization catalysts when producing dimers and trimers boiling in the gasoline boiling range from normally gaseous olefins or when producing tetramers or higher polymers useful as chemical intermediates.

The olefin feeds useful in the present invention include the normally gaseous olefins such as ethylene, propylene, butylenes, and the higher olefins such as pentalenes, hexalenes and the like. The olefin feed may consist of 100% olefins or may contain paraffinic diluents or other such diluents. The rate at which the olefin feed is introduced into the reaction zone will depend to a large extent on the conversion level desired and on the amount of effluent that is recycled. Generally, olefin throughput, neglecting recirculation of effluent, may range from about 0.3 to 2.0 gallons of feed per hour per pound of catalyst. Since extremely large amounts of reaction zone effluent are recycled, the superficial velocity of fresh olefin feed may be quite low.

To illustrate a typical operation, a $C_4$ hydrocarbon feed containing about 50% olefin is employed as feed stock. The reaction zone is maintained at about 450° F. and 1000 p. s. i. g. A suspension consisting of finely divided solid catalyst comprising 80% phosphoric acid deposited on 20% silica gel in fluid hydrocarbon comprising olefin feed and polymerization products is maintained throughout the reaction zone. The catalyst concentration in the suspension is maintained at about 30 lbs./cu. ft., the catalyst itself having a bulk density of about 60 lbs./cu. ft. Olefin feed is introduced into the bottom of the reactor at a rate of 1 gallon/hour/pound of catalyst, the size of the reactor being such that the superficial velocity of fresh olefin feed is about 0.001 ft./sec. The withdrawn effluent is separated into its solid particle and hydrocarbon components. The amount of product stream withdrawn from the system is controlled so that the ratio of recycle effluent to feed, on a volume basis, is about 285:1. The major portion of the recycle effluent is introduced as high velocity jets as heretofore described, while a minor portion thereof is introduced in admixture with the olefin feed. This results in a superficial velocity of fluid through the reaction zone of about 0.3 ft./sec. which is sufficient to maintain the catalyst in suspension and to obtain turbulence and mixing within the reaction zone. The separated catalyst is continuously recycled to the lower portion of the suspension.

While the above operation has been described in connection with only one reaction zone, it will be obvious to the skilled workmen that two or more such zones may be operated in series in order to obtain high olefin conversion or to obtain other process modifications. The process of the present invention may also be employed in conjunction with other conventional types of polymerization operations, such as a fixed bed unit operating in series with a reaction zone of the type described.

Since conventional solid polymerization catalysts, such as phosphoric acid deposited on kieselguhr, tend to agglomerate due to the formation of sticky deposits thereon after prolonged operation periods, it may be desirable to include in the suspension a small amount, such as about 5% to 30% based on the catalyst, of a finely divided solid diluent. Solid diluents, particularly adsorbents such as silica gel, alumina, activated carbon and the like, when maintained in cosuspension with the catalyst, substantially eliminate such agglomeration difficulties. The adsorbent will, of course, be withdrawn in the effluent suspension and will be separated in the cyclone separator or other separating devices and returned to the reaction zone along with the catalyst.

It will also be obvious to the skilled workman that certain types of polymerization catalysts, such as solid phosphoric acid catalysts, will require the periodic or continual introduction of a small amount of water of hydration into the reaction zone in order to maintain maximum catalyst activity. This water may be introduced with the olefin feed or may be injected from another source into the reaction zone. Generally the amount of water maintained in the reaction zone is such that its partial pressure will substantially balance the vapor pressure of the catalyst under reaction conditions.

What is claimed is:

1. A continuous non-regenerative catalytic process for polymerizing olefin hydrocarbons which comprises providing a reaction zone including a bottom olefin feed inlet and a top effluent outlet, maintaining throughout said zone a suspension of finely divided solid polymerization catalyst in fluid hydrocarbon, continuously passing olefin feed upwardly through said suspension at polymerization conditions, continuously withdrawing effluent suspension from the upper part of said zone and separating solids from said effluent suspension, dividing the resulting substantially solid-free effluent into a product stream and a recycle stream, introducing said recycle stream into said suspension, at least a major portion of which is introduced as at least one jetted stream at a lower intermediate point in said reaction zone, the direction of flow of said jetted stream being substantially traverse to the flow of said olefin feed through said zone whereby substantial mixing of said suspension takes place, and introducing said separated solids into a lower portion of said suspension at a point intermediate said olefin feed inlet and point of introduction of said jetted stream whereby said catalyst is recirculated through said zone.

2. A process as in claim 1 wherein a minor portion of said recycle stream is introduced into said reaction zone with said olefin feed and is passed upwardly through said suspension.

3. A process as in claim 2 wherein said minor portion is at least 10% of said recycle stream.

4. A process as in claim 1 wherein the volume ratio of said recycle stream to said olefin feed is at least 30:1.

5. A process as in claim 4 wherein at least 10% of said recycle stream is introduced with said olefins into said reaction zone.

6. A process as in claim 1 wherein said jetted recycle stream is introduced into said suspension above the point at which said separated solids are introduced therein.

References Cited in the file of this patent

UNITED STATES PATENTS

| | | |
|---|---|---|
| 2,131,191 | Roetheli et al. | Sept. 27, 1938 |
| 2,171,250 | Archibald | Aug. 29, 1939 |
| 2,436,595 | Nicholson | Feb. 24, 1948 |
| 2,571,262 | Latchum | Oct. 16, 1951 |
| 2,626,292 | Gornowski | Jan. 20, 1953 |
| 2,658,933 | May et al. | Nov. 10, 1953 |